United States Patent
Aidlin et al.

[11] Patent Number: 5,586,637
[45] Date of Patent: Dec. 24, 1996

[54] VARIABLE ANGLE CONVEYOR ASSEMBLY WITH STEPPED CLEAT

[76] Inventors: Samuel S. Aidlin, 5079 Village Garden Dr., Sarasota, Fla. 34234; Stephen H. Aidlin, 1521 Eastbrook Dr., Satasota, Fla. 34231; Larry Kincaid, 2635 Hyde Park St., Sarasota, Fla. 34239; Kenneth Cordonnier, 1970 Seton Dr., Clearwater, Fla. 34623; Robert Ledwith, 6210 99th St., E. Bradenton, Fla. 34202; Robert J. Hencke, 302 73rd St., NW. Bradenton, Fla. 34209

[21] Appl. No.: 380,638

[22] Filed: Jan. 30, 1995

Related U.S. Application Data

[63] Continuation-in-part of Ser. No. 199,737, Feb. 22, 1994, Pat. No. 5,394,972.

[51] Int. Cl.⁶ .................................................. B65G 47/24
[52] U.S. Cl. ........................................... 198/397; 198/396
[58] Field of Search .............................. 198/367.1, 396, 198/397, 406, 493, 801

[56] References Cited

U.S. PATENT DOCUMENTS

| | | | |
|---|---|---|---|
| 4,042,099 | 8/1977 | Sterling | 198/397 X |
| 4,735,343 | 4/1988 | Herzog | 198/397 X |
| 5,333,716 | 8/1994 | Hoppmann et al. | 198/397 X |
| 5,333,718 | 8/1994 | Pannell et al. | 198/397 |

FOREIGN PATENT DOCUMENTS

| | | | |
|---|---|---|---|
| 0252822 | 10/1988 | Japan | 198/397 |

Primary Examiner—James R. Bidwell

[57] ABSTRACT

A new and improved conveying system for lifting and orienting caps comprising a conveyor belt which is formed of articulated sections and with guide rollers to support the belt with an upper lifting section having an essentially vertical path of travel and a lower loading section with an angled path of travel. Also included are sprockets on the guide rollers to effect movement of the belt in an upward path of travel through the lower section and then the upper section. Further included is a plurality of cleats secured to the exterior surface of the conveyor belts. The cleats have supporting surfaces which extend at right angles from the exterior surface of the conveyor belt for retaining bottle caps thereon in a proper orientation when the upper surface of the cap is in contact with the conveyor belt and the lower edge thereof supported on the supporting surfaces of the cleats but to effect the dropping thereof when the caps are not in the proper orientation.

17 Claims, 9 Drawing Sheets

5,586,637

VARIABLE ANGLE CONVEYOR ASSEMBLY WITH STEPPED CLEAT

This application is a Continuation-In-Part of application Ser. No. 08/199,737 filed Feb. 22, 1994, now issued as U.S. Pat. No. 5,394,972 on Mar. 7,1995.

BACKGROUND OF THE INVENTION

1. Field of the Invention

This invention relates to a conveyor system for lifting and orienting multi-diameter push-pull bottle caps and more particularly, to lifting and orienting multi-diameter push-pull bottle caps through a conveyor with a lower loading zone and a vertical lifting zone and a plurality of outlet chutes which are adjustable to the needs of the run.

2. Description of the Background Art

In the past, multi-diameter push-pull caps for container closures such as for ketchup and mustard or the like were oriented during feeding by changing the angle of an inclined cleated conveyor. This angular change caused incorrectly oriented caps to fall from the cleat and back into a hopper at a loading zone. Incorrectly oriented caps are considered to be those with the open side toward the conveyor belt. Correctly oriented caps are considered to be those having the open side away from the conveyor belt. The large variety of multi-diameter push-pull caps make the conventional cleat having a rectangular cross-section obsolete.

The present invention is an assembly for quickly changing cleats to accommodate the different individual push-pull caps needed to minimize down time in the food filling operation. The invention varies the angle on all cleated conveyor style cap orientors and feeders. The assembly can be installed on an existing inclined cleated conveyor type orientor to vary the angle. The rectangular cleat is incapable of correctly selecting and holding the push-pull cap on the belt thus resulting in frequent shut-downs of the food processing filling operation due to a shortage of correctly oriented multi-diameter push-pull caps ready to close a filled container. The increasing popularity of push-pull caps in food packaging operations has created a need for a cleat that can orient push-pull caps properly and convey the caps to an outlet chute for mating with a filled food container. A push-pull cap has a base having a larger diameter and a dispensing nozzle having a smaller diameter. Currently known cleats with a conventional rectangular cross section cannot orient push-pull caps effectively.

It is, therefore, an object of this invention to provide an improvement which overcomes the aforementioned inadequacies of the prior art devices and provides an improvement which is a significant contribution to the advancement of the push-pull cap orientation art.

Another object of this invention is to provide a new and improved conveying system for lifting and orienting multi-diameter push-pull bottle caps comprising a conveyor belt which is formed of articulated sections and with guide rollers to support the belt with an upper lifting section having an essentially vertical path of travel and a lower loading section with an angled path of travel. Also included are sprockets on the guide rollers to effect movement of the belt in an upward path of travel through the lower section and then the upper section. Further included is a plurality of rods secured to the exterior surface of the conveyor belts. A plurality of cleats are fastened to the rods and have supporting surfaces which extend at right angles from the exterior surface of the conveyor belt for retaining push-pull bottle caps thereon in a proper orientation when the nose of the dispensing nozzle of the bottle cap is in contact with the conveyor belt and the larger diameter thereof is on a supporting tread of the cleats but to effect the dropping thereof when the bottle caps are not in the proper orientation. A source of pressurized fluid is adjusted adjacent to the upper extent of the upper section at one lateral side of the belt to pneumatically urge bottle caps to the opposite lateral side of the belt whereof a plurality of chutes selectively receive the pneumatically conveyed push-pull bottle caps while maintaining their proper orientation are situated. Also included is a supplemental sprocket in contact with the interior face of the conveyor belt in the lower extent of the upper section to form an outwardly directed bow in the belt and effect the removal, by gravity, of push-pull bottle caps not in the proper orientation. Further included are adjustment means to vary the extent of the bow as a function of the particular push-pull bottle cap being conveyed.

It is a further object of the invention to bow the lower end of a vertical conveyor to drop off improperly oriented caps.

It is a further object of the invention to vary the extent of a conveyor bow as a function of the push-pull caps being conveyed.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new and improved conveying system for lifting and orienting multi-diameter push-pull bottle caps comprising a conveyor belt which is formed of articulated sections and with guide rollers to support the belt with an upper lifting section having an essentially vertical path of travel and a lower loading section with an angled path of travel. Also included are sprockets on the guide rollers to effect movement of the belt in an upward path of travel through the lower section and then the upper section. Further included is a plurality of rods secured to the exterior surface of the conveyor belts. A plurality of cleats have supporting surfaces which extend at right angles from the exterior surface of the conveyor belt for retaining push-pull bottle caps thereon in a proper orientation when the nose of the dispensing nozzle of the bottle cap is in contact with the conveyor belt and the larger diameter thereof on a supporting tread of the cleats but to effect the dropping thereof when the push-pull bottle caps are not in the proper orientation. The cleats have a stepped rectangular cross section and are secured directly to the belt with fasteners. An inward face of the cleat has a recess adapted to slidably engage the rod. Also included is a supplemental sprocket in contact with the interior face of the conveyor belt in the lower extent of the upper section to form an outwardly directed bow in the belt and effect the removal, by gravity, of bottle caps not in the proper orientation. Further included are adjustment means to vary the extent of the bow as a function of the particular push-pull bottle cap being conveyed. Further included is a plate positioned in close proximity to the cleats in the region of the conveyor belt beneath the bow whereby bottle caps on the conveyor belt may drop under gravity into the hopper due to the orientation of the bow. Still further included is a source of pressurized fluid adjusted adjacent to the upper extent of the upper section at one lateral side of the belt to pneumatically urge bottle caps to the opposite lateral side of the belt whereof a plurality of chutes selectively receive the pneumatically conveyed push-pull bottle caps while maintaining their proper orientation are situated. A hopper is also included for a quantity of randomly oriented bottle caps adjacent to the lower section of the conveyor belt for the initial positioning of bottle caps on the conveyor belt prior to movement to the bow. Further included is a shield which has a raised central extent parallel with the direction of flow of the conveyor belt and positioned over the lower loading section whereby bottle caps dropped thereon will limit movement of the caps onto the conveyor except at the leading edge of the plate.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 16 further discloses blank portions of the visible vernier for the operator to record the desired bow angle for the different style and size multi-diameter push-pull caps that will be processed;

Similar reference characters refer to similar parts throughout the several views of the drawings.

DETAILED DESCRIPTION OF THE PREFERRED EMBODIMENT

The present invention, the new and improved conveying system for lifting and orienting multi-diameter push-pull bottle caps, is comprised of a plurality of components. In their broadest context, such components include a conveyor belt, sprockets to effect the movement of the belt, a plurality of rods on the surface of the belt, a plurality of stepped cleats in releasable attachment with the rods and the belt for quickly changing to accommodate any particular size and shape push-pull cap, a supplemental sprocket for creating a bow, adjustment means for varying the extent of the bow, a keeper to maintain the bow at a predetermined configuration, a plate having a graphic indicia to guide the machine operator in setting the desired degree of bow, a source of pressurized fluid at the upper extent of the belt, a plurality of outlet chutes disposed laterally on an opposite side of the belt and colinear with the pressurized fluid source to receive the pneumatically conveyed push-pull caps, a shield to preclude the direct dropping of caps onto the belt, and a plate to preclude falling caps from inadvertently removing properly oriented caps. Such components are specifically configured and correlated with respect to each other to attain the desired objectives.

A common problem in the food processing operation is the production lines have to be stopped when bottle caps 8 are changed from a plastic closure to a metal closure, and vise versa. This results in a severe reduction in machine productivity and hence increases the direct cost of producing the food item. The instant invention eliminates this problem by providing a plurality of outlet chutes oriented laterally and adjacent to the movable cleat and gates to direct the caps to the correct pathway.

Figure 1:
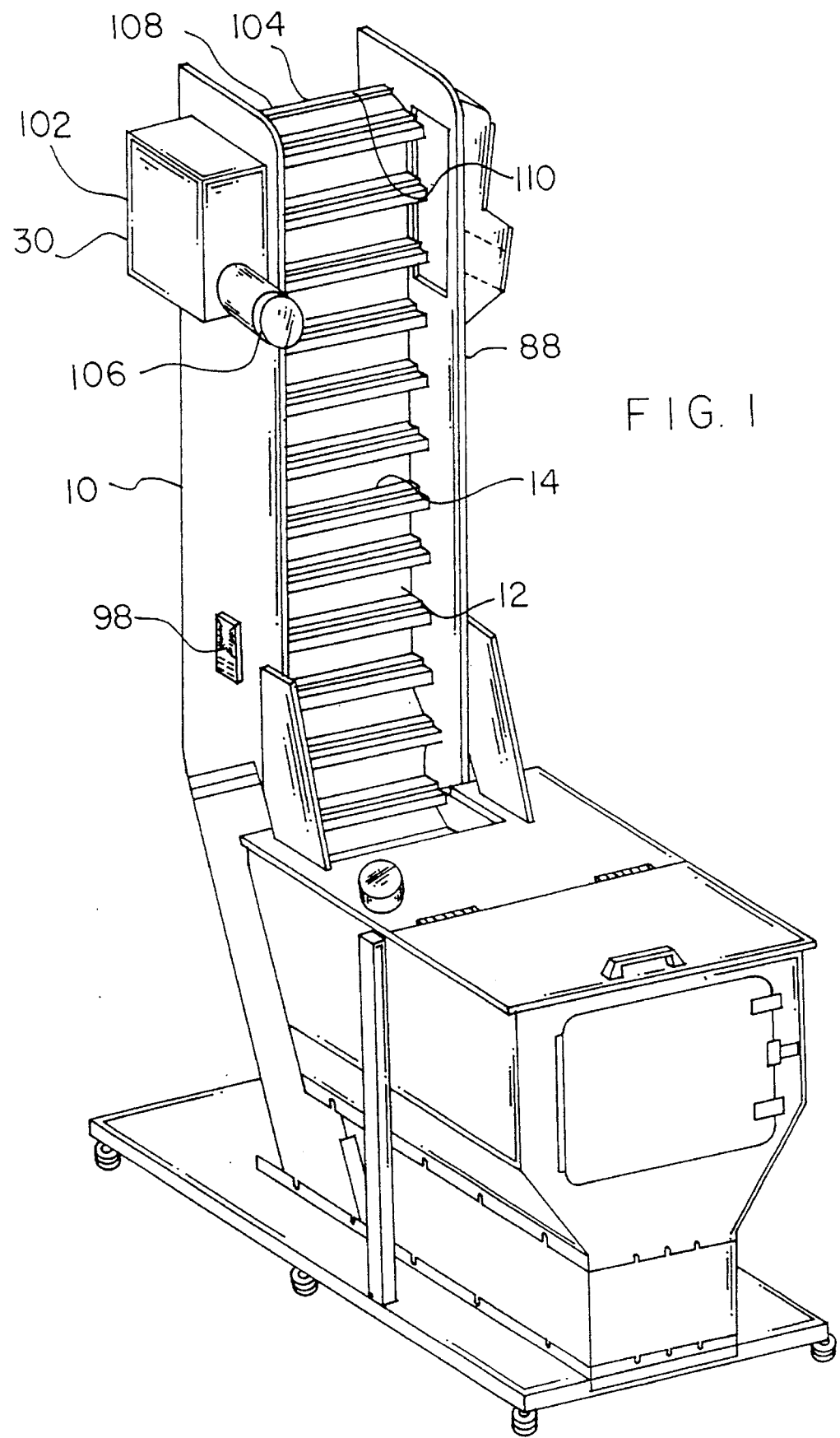
FIG. 1 is a perspective illustration of the preferred embodiment of the new and improved conveying system for lifting and orienting push-pull bottle caps constructed in accordance with the principles of the present invention.
Figure 2:
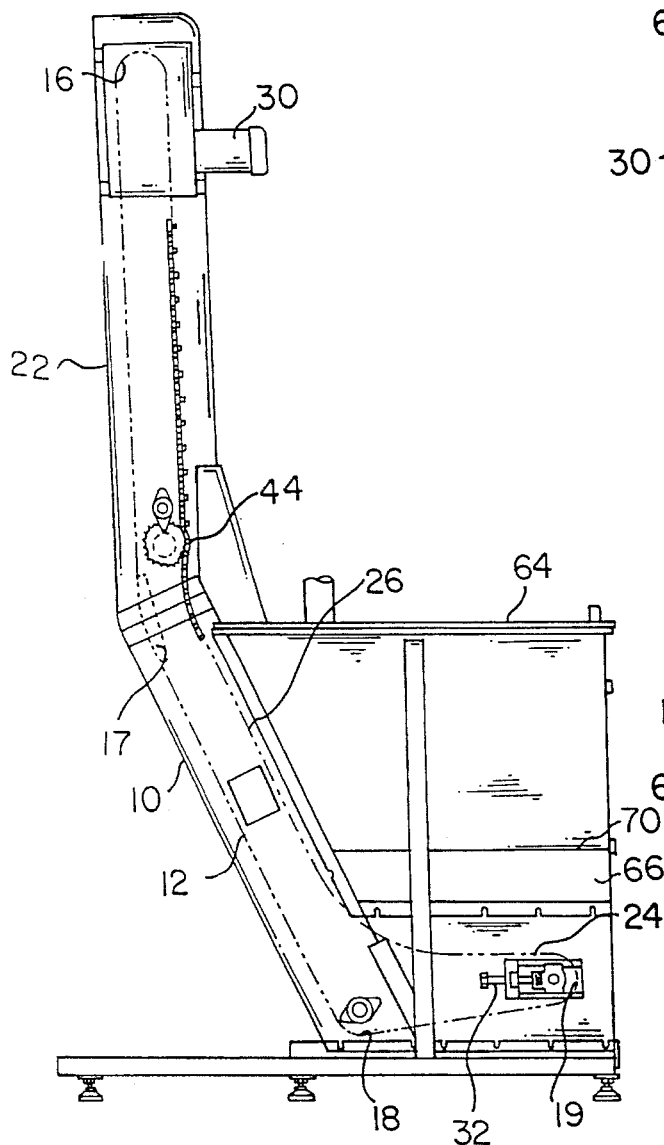
FIG. 2 is a side elevational view of the device shown in FIG. 1.
Figure 3:
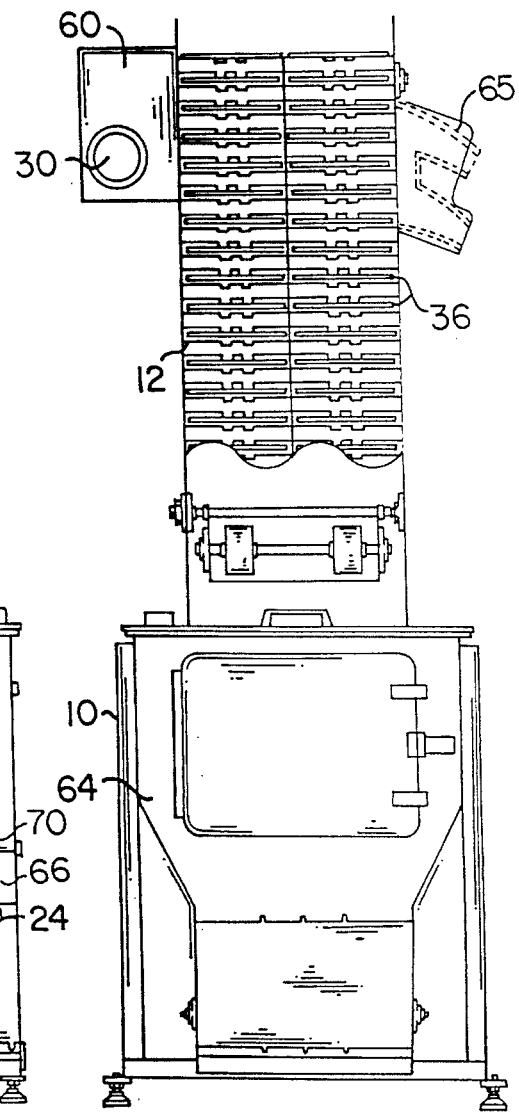
FIG. 3 is a front elevational view of the device shown in FIGS. 1 and 2 but with parts broken away to shown certain internal constructions.

Referring generally to FIG. 1, the main component of the system is a housing 10 adapted to support a conveyor belt 12 constrained for movement in a predetermined path of travel. The conveyor belt is formed of articulated sections 14 coupled with respect to each other along lines perpendicular to the path of travel. As best seen in FIG. 2, rotatable rollers 16, 18 and 19 support the belt in a configuration to constitute an upper lifting section 22 having an essentially vertical path of travel and a lower loading section 24 with an angled path of travel slightly offset from the horizontal. An intermediate section 26 is located between the upper and lower sections. The upper guide roller 16 is driven by a motor 30 while the remaining guide rollers are idlers for movement as caused by the belt 12 being driven by the drive roller.

An adjustment device 32 is secured to the housing 10 and is coupled with regard to the roller beneath the lower section to maintain a proper tension on the belt 12 during operation and use.

Figure 5:
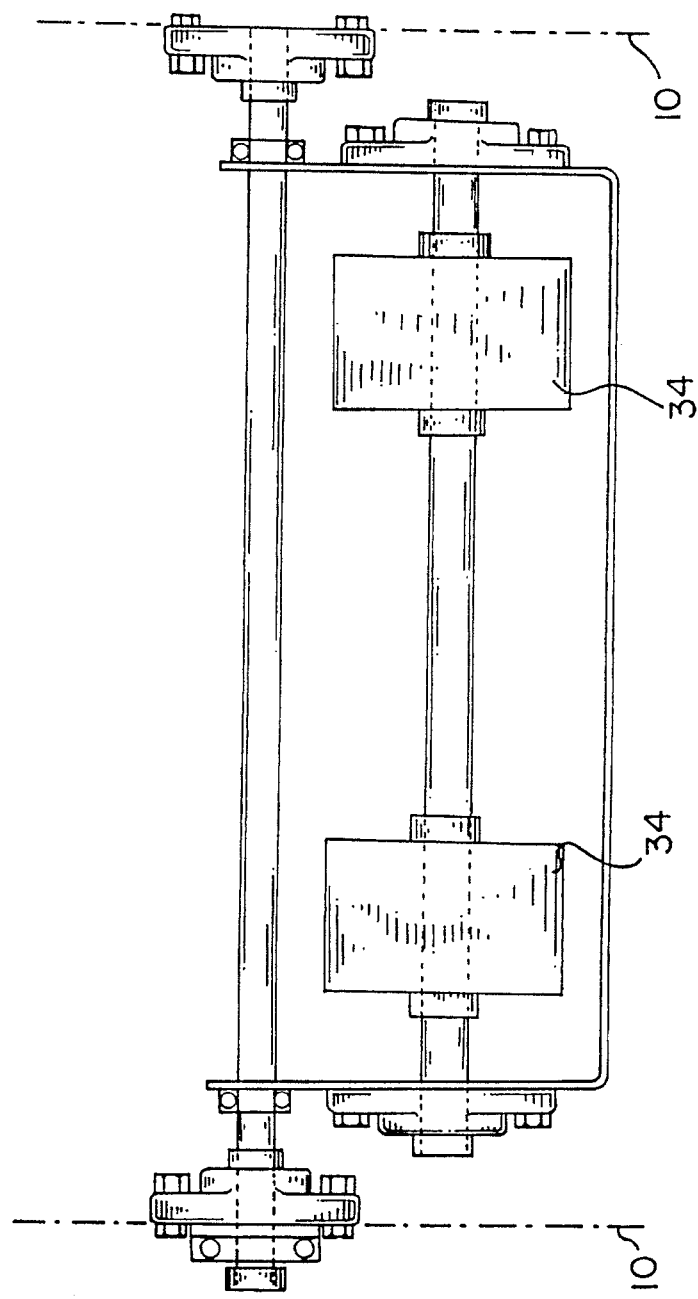
FIG. 5 is a front elevational view of the mechanism shown in FIG. 4.
Figure 4:
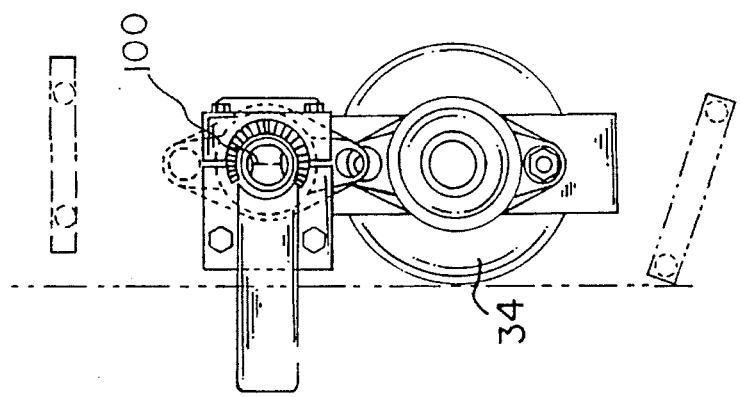
FIG. 4 is an enlarged side elevational view of the mechanisms for adjusting the angle of bow in the conveyor.
Figure 6:
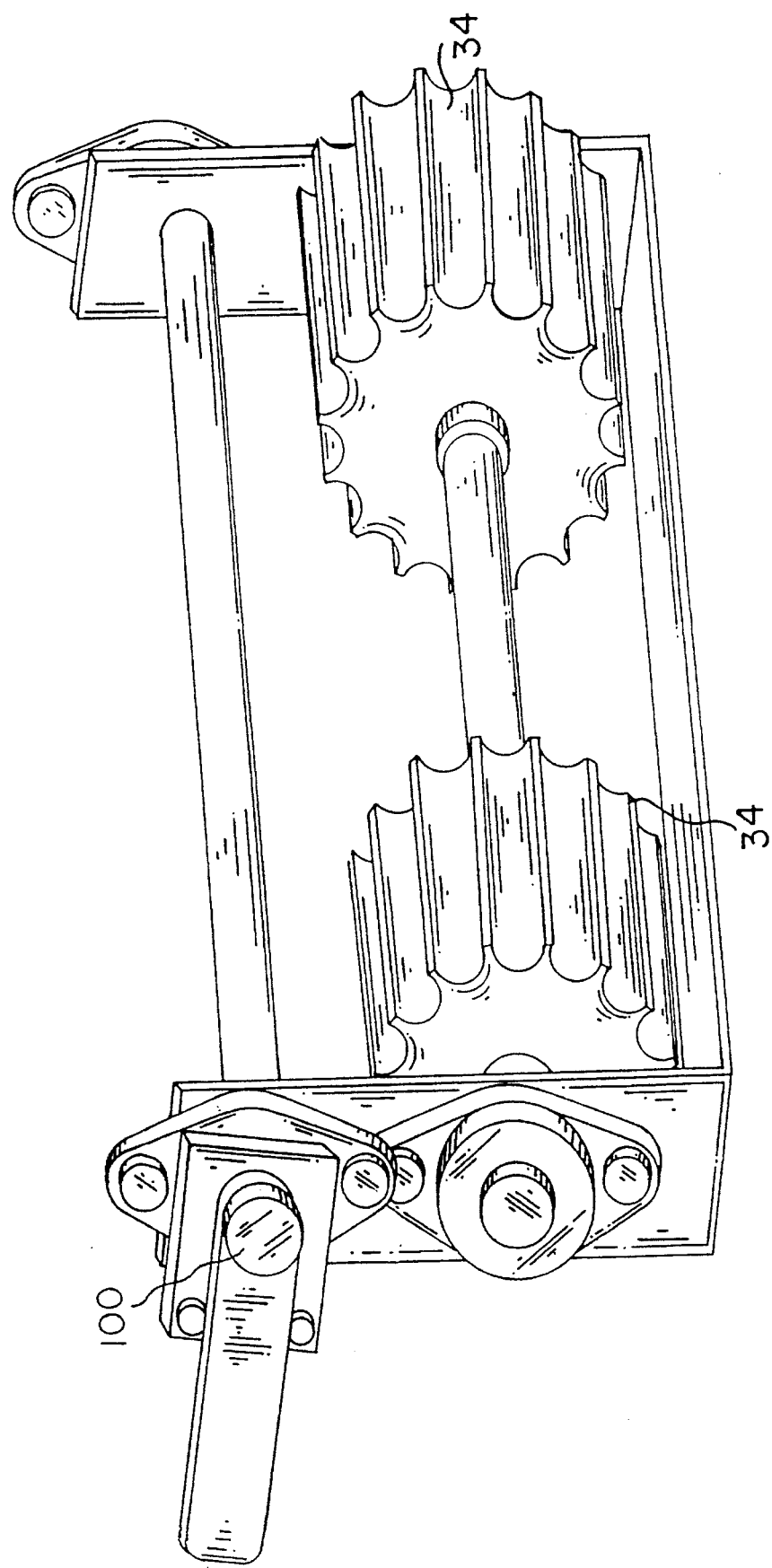
FIG. 6 is a perspective illustration of the mechanism disclosed in FIGS. 4 and 5.
Figure 7:
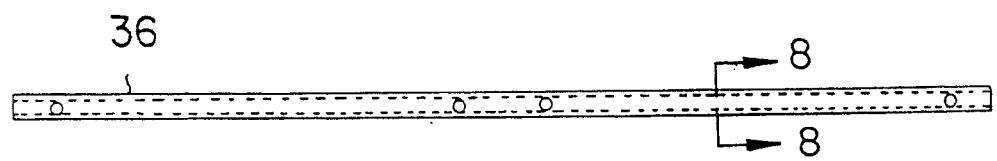
FIG. 7 is a front elevation view of the elongated metallic rod member disclosing the plurality of apertures adapted to receive the fasteners for securement to the surface of the conveyor belt.
Figure 8:
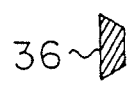
FIG. 8 is a cross-sectional view of the elongated metallic rod taken along viewing lines 8—8 in FIG. 7.
Figure 9:
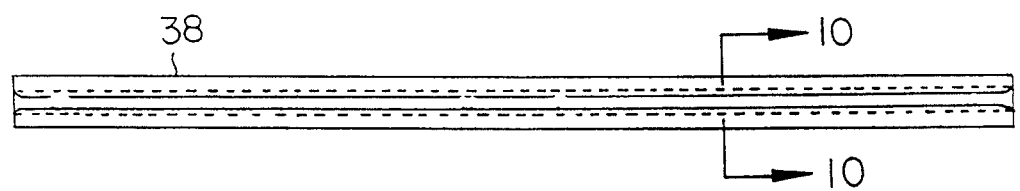
FIG. 9 is a front elevation view of the elongated stepped cleat member disclosing the plurality of apertures adapted for securing the stepped cleat to the metallic rod therebeneath with a plurality of fasteners.
Figure 10:
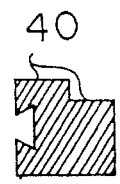
FIG. 10 is a cross-sectional view of the stepped cleat disclosing the lower tread and the upper tread and the riser therebetween and also disclosing the inner face of the stepped cleat having a trapezoidal cross-section for urging slidable engagement with the elongated metallic rod.
Figure 11:
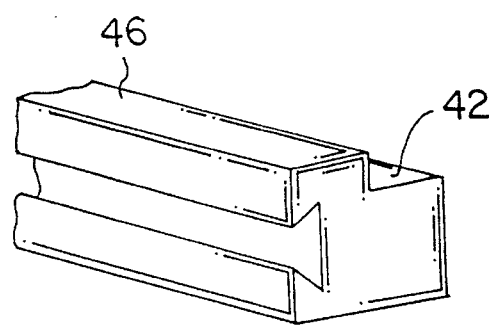
FIG. 11 is a partial perspective view of the preferred embodiment of the invention.

As best seen in FIGS. 5 and 6, a pair of sprockets 34 are located on each of the guide rollers to effect movement of the belt 12 in an upward path of travel through the lower section 24, intermediate section 26 and then the upper section 22.

Figure 12:
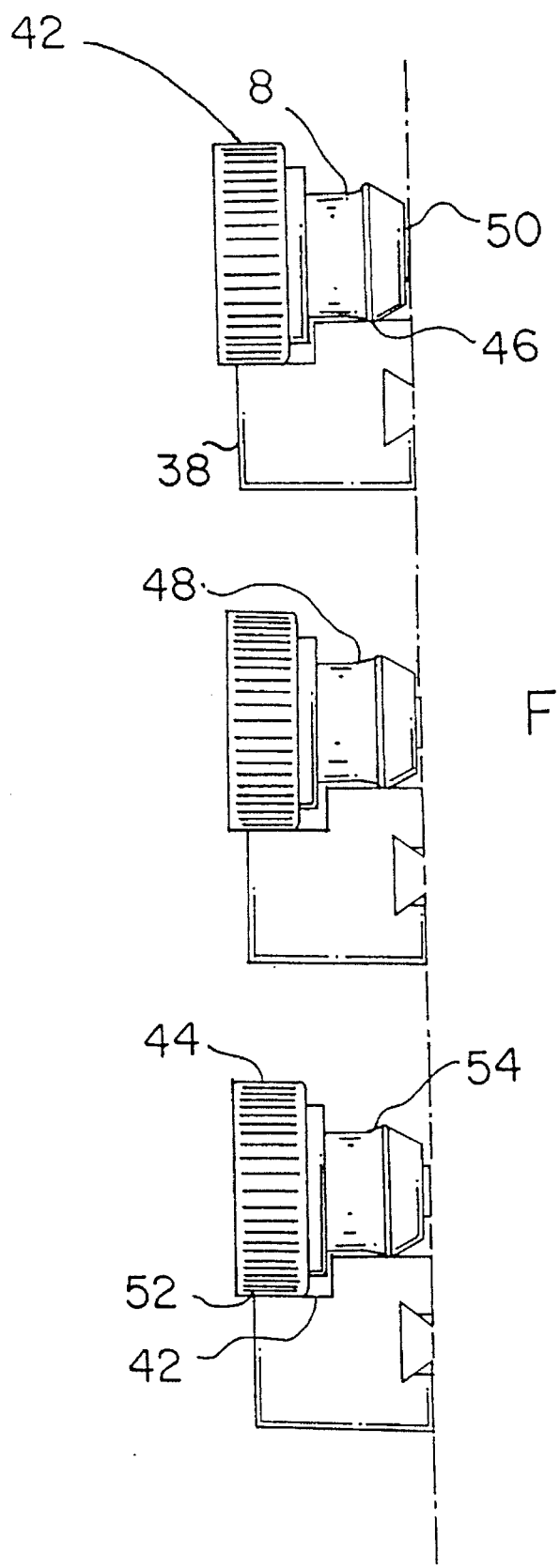
FIG. 12 is a side elevational view of the invention showing the stepped cleat in slidable communication with the metallic rod on the conveyor belt and supporting the lower base diameter of the push-pull cap on the lower tread and the smaller diameter on the upper tread and further having the nose of the push-pull cap in contact with the surface of the conveyor belt.

Located on the exterior surface of the conveyor belt are a plurality of rods 36 and stepped cleats 38. Each rod 36 extends laterally across essentially the entire width of the belt 12. They are spaced in the direction of the path of travel and are fastened to the belt 12 and are adapted to receive a cleat 38 quickly in releasable attachment, as best seen in FIGS. 7–10. Each cleat 38 has a plurality of supporting treads 40 extending at right angles from the exterior surface of the conveyor belt. As best seen in FIG. 12, a lower tread 42 supports the larger base diameter 44 of the push-pull bottle caps 8 thereon by gravity in a proper orientation. An upper tread 46 supports the smaller dispensing nozzle 48 of the bottle cap 8 when the nose 50 of the bottle cap 8 is in contact with the conveyor belt. In such proper orientation, a cylindrical edge 52 of the larger base diameter of the cap 8 is in contact with the lower tread 42 of the cleat 38 and a cylindrical edge 54 of the smaller diameter dispensing nozzle 48 of the cap 8 is in contact with the upper tread 46e When so properly oriented, the caps may be elevated through the upper section of the belt in a vertical orientation. When not properly oriented, the push-pull caps 8 will simply fall by gravity from the surface of the belt away from the cleat 38 when entering the upper lifting section of the conveyor.

A plurality of chutes 56 are organized in a stacked relationship for receiving a pre-determined sized and shape push-pull cap 8, based on the materials of construction of the cap 8 and the major diameter 44 of the cap. A lowermost chute 58 is sized and adapted to receive the push-pull caps 8 made from an elastomeric material, preferably a plastic material having a major diameter 44 about between 43 millimeters in diameter. An intermediate chute 60 disposed immediately above the lowermost chute 58 has a pathway 62 that is adapted to receive caps 8 made from a metal, preferably a bio-compatible metal that will not react adversely with food and is sized to receive a push-pull cap 8 having a major diameter 44 of preferably about between 38 millimeters. An uppermost chute 64 located immediately adjacent and above the intermediate chute 58 has a pathway 66 that is adapted to receive either the plastic push-pull cap or the metallic push-pull cap and return the cap 8 to a hopper 68 therebelow. The uppermost chute 64 is only used if there is a downstream blockage or interruption in the food processing operation such that the selected caps 8 have reached an overflow condition and a pathway 70 is full in the lowermost chute 58 in the case of the plastic push-pull cap or the pathway 62 is full in the intermediate chute 60 in the case of the metallic push-pull cap.

Figure 13:
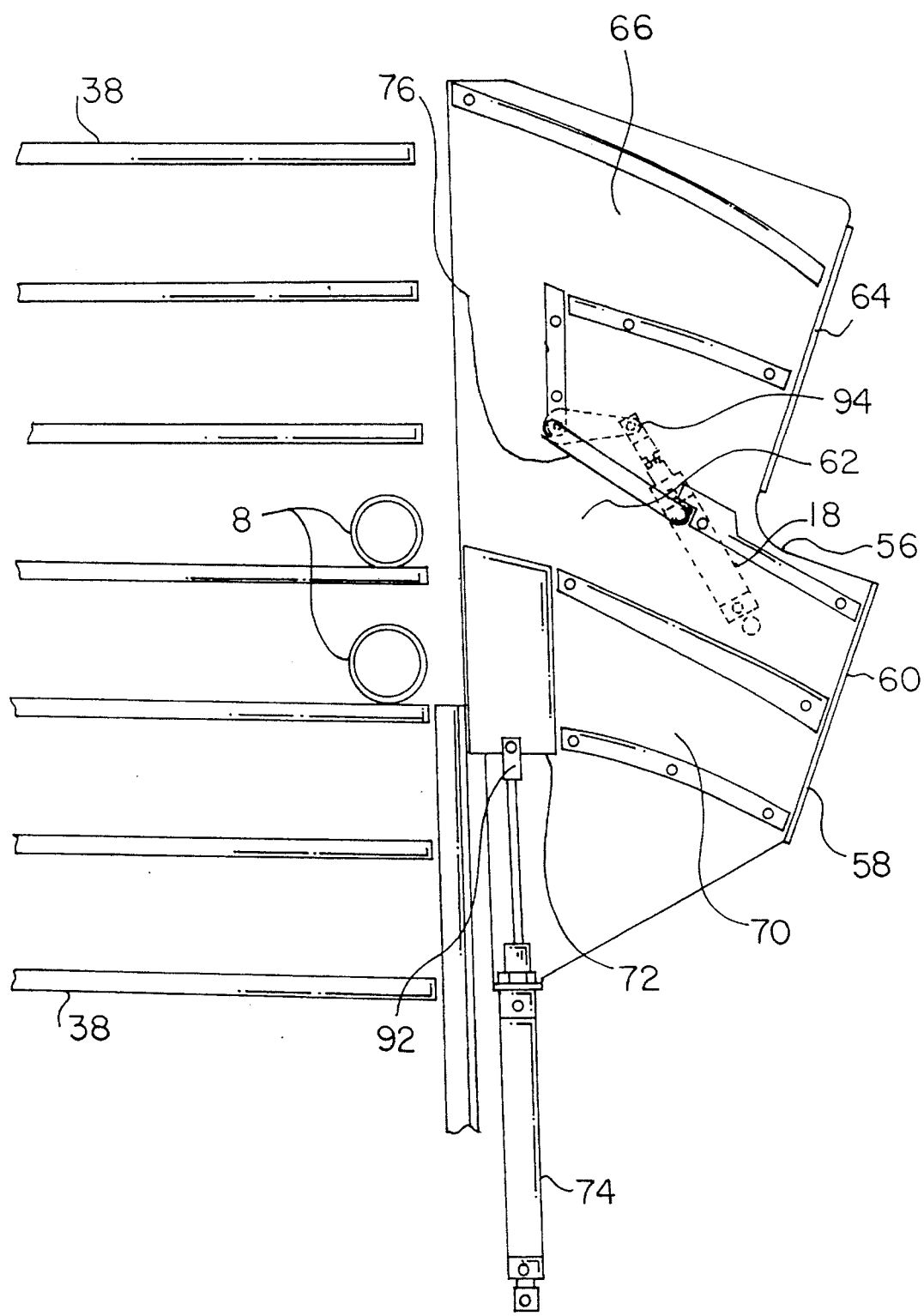
FIG. 13 is a partial front elevation view of the invention showing the plurality of chutes and the conveyor belt with the lowermost and intermediate chute being in a position to process metallic multi-diameter push-pull caps through the intermediate chute and the lower fluid cylinder actuator being positioned to block access to the lowermost chute.
Figure 14:
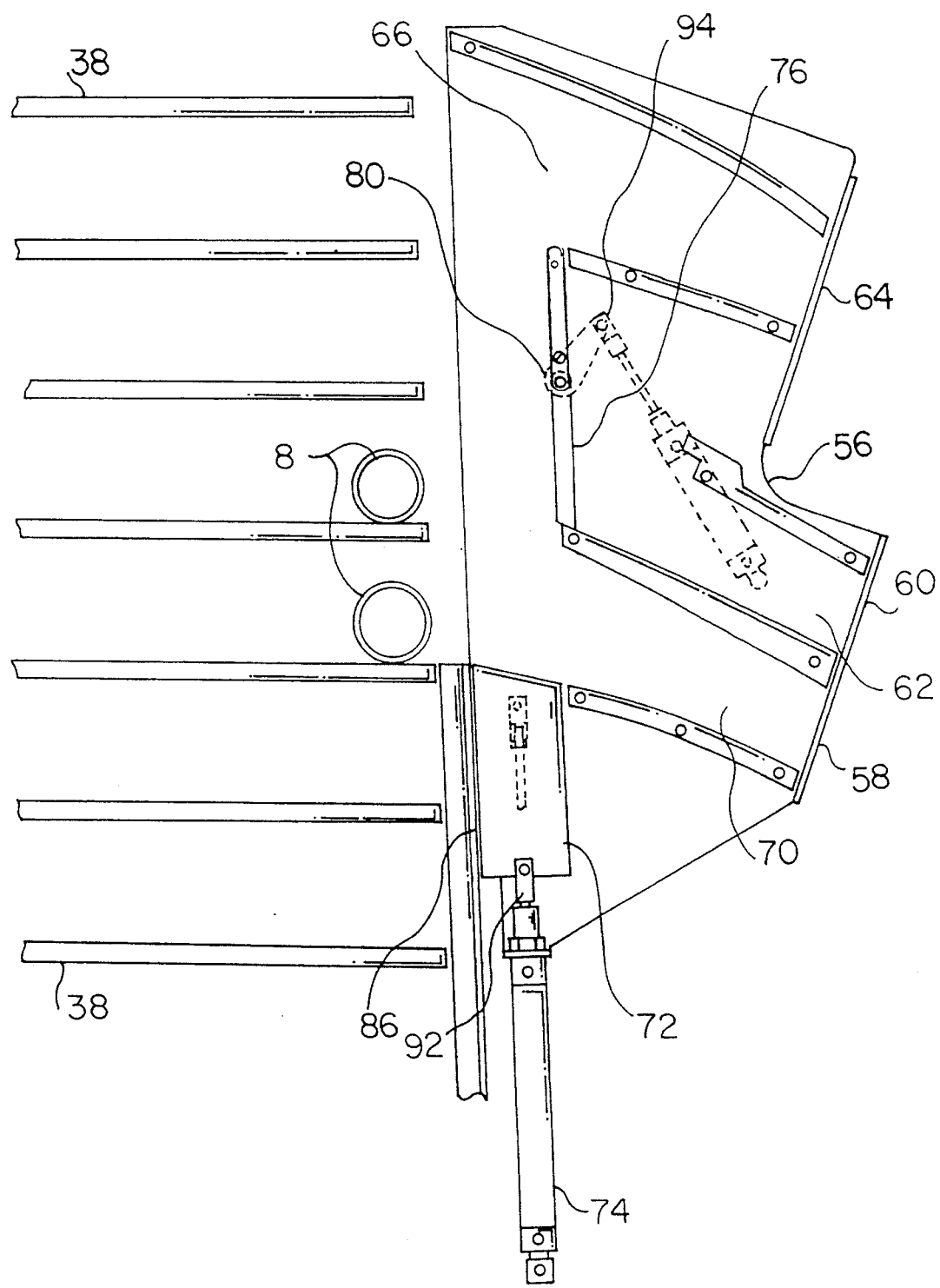
FIG. 14 is a partial front elevation view of the invention in a status to reverse the process flow of that shown in FIG. 13; that is, the first fluid cylinder is in a retracted position and the second fluid cylinder is in an extended position thereby allowing plastic caps to be processed by the lowermost chute and blocking off access for metallic caps to the intermediate chute.

As best seen in FIG. 13, the lowermost chute 58 has a first gate 72 that is actuated by a pneumatic fluid actuator 74 to close off the pathway 70 when the operator desires to have metallic caps selected through the intermediate chute 60. The intermediate chute 60 has a second gate 76 actuated by a second pneumatic actuator 78 and is in the retracted position for allowing metallic push-pull caps to proceed down the pathway 62 of the intermediate chute 60. When the operator wishes to change over and use the plastic caps for another type of food container, the pneumatic actuators 74 and 78 are reversed. That is, the second gate 76 returns via a pivotable mechanism 80 to a vertical orientation which effectively closes off the pathway 62 to the metallic caps, as best seen in FIG. 14. The gate 72 on the lowermost chute 58 is retracted and accordingly is removed from the pathway 70 of the lowermost chute 58 which is now in a position to receive the pneumatically conveyed plastic push-pull caps from the stepped cleat 38 for transmission to a subsequent food processing filling operation. When the demands of the food operation require a metallic cap, the process is reversed. That is, the gate 72 on the lower pathway 70 is extended to effectively close off the pathway 70 on the lowermost chute 58. Likewise, the second gate 76 that closes off the pathway 62 to the intermediate chute 60 is now pivotally retracted out of the pathway 62 of the intermediate chute 60 thereby allowing the metallic push-pull caps to be pneumatically conveyed from the stepped cleat 38 and transmitted through the pathway 62 of the intermediate chute 60 to subsequent food filling processing operations.

In this manner, the selected caps 8 travel laterally off of the stepped cleat 38 into the intermediate chute 60 for subsequent processing for food items that requires a metal cap. It should be understood that the travel of the gate 72 is restricted to closing the pathway 70 of only the lowermost chute 58. The pathway 66 to the overflow or uppermost chute 64 is open at all times to receive any caps 8 that have not been directed to one of the two lower chutes, either the lowermost chute 58 (plastic) or the intermediate chute 60 (metal).

The first fluid actuator 74 is oriented on a side 86 of the conveyor and underneath the lower chute 58. It is attached to a frame 88 of the housing 10 with threaded fasteners. The first fluid actuator 74 is in pneumatic communication with a gate 72 on an end 92 that is in a normally retracted position to urge the lowermost chute 58 to receive plastic caps. When the operator decides to change from a plastic cap to a metal cap, he merely activates the first fluid actuator 74 to extend the gate 72 in an upward direction to block off the access to the lowermost chute 58. Simultaneously, the second fluid actuator 78 which is in pneumatic communication with the second gate 76 on an end 94 is oriented above and adjacent the intermediate chute 60. The second fluid actuator 78 is activated to pivotally rotate the second gate 76 from blocking access to the intermediate chute 60 into a retracted position which opens access to the intermediate chute 60. In this manner, the selected caps will now traverse the intermediate chute 60 for food items that require a metal cap for subsequent processing in the food processing plant. At no time do either of the first or second fluid actuators 74, 78 interpose gates 72, 76 between the conveyor belt and the uppermost or overflow chute 64. Chute 64 is always opens to receive caps 8 that have not been directed to either the lowermost 58 or intermediate chute 60. The uppermost chute 64 is adapted and sized to receive either a plastic cap or a metal cap.

Figure 15:
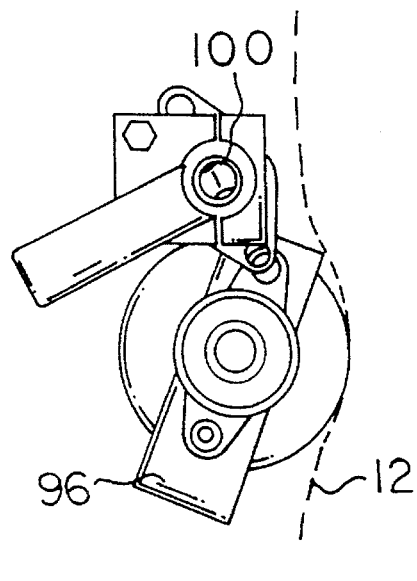
FIGS. 15 and 15A show the adjustment means bowing the conveyor belt in a fashion to achieve the selection of only properly oriented multi-diameter push-pull caps.
Figure 15A:
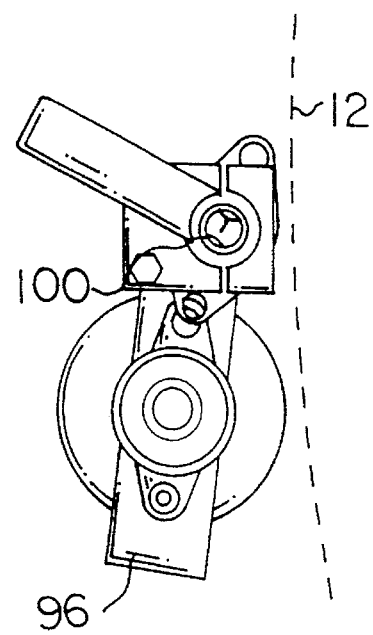
Figure 16:
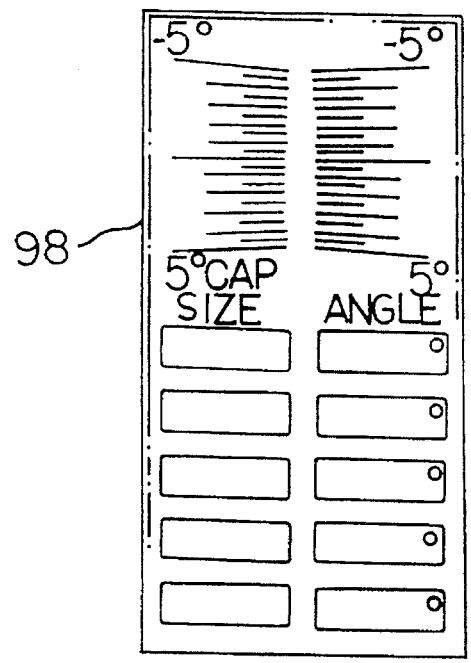
FIG. 16 discloses the visible vernier having a range of settings for a bow angle of plus or minus 5°.

As best seen in FIGS. 15 and 15A, an adjustment means 96 oriented on the housing 10 assists the operator in quickly setting the degree of bow desired that will properly select the caps 8 on the plurality of stepped cleats 38 as they traverse the housing 10 in an upward direction on the conveyor belt 12. The adjustment means 96 includes a visible vernier 98, with a range of settings for the bow angle, preferably plus or minus 5 degrees, as best seen in FIG. 16. The vernier 98 is set by loosening a lock nut 100 and backing off the nut 100 until the desired angle is indicated on the vernier 98. In use and operation, the operator then intermittently engages the conveyor belt 12 to determine that in fact the conveyor belt 12 has achieved the desired bow setting to dislodge improperly oriented caps off of the stepped cleat 38. When that setting has been achieved, the operator tightens the lock nut 100 and resumes full operation.

Located at an upper extent 102 of an upper lifting section 104 is a source 106 of pressurized fluid, preferably air. The source is located at one lateral edge 108 of the conveyor belt and tends to pneumatically propel supported caps to a second opposed lateral edge 110 of the conveyor belt 12. The opposite lateral edge 110 is in transfer communication with the plurality of guide chutes 58, 60, 64 whereby caps conveyed laterally by the flow of pressurized fluid will enter one of the guide chutes 58, 60, 64 for further movement to a filled container. The caps 8 are then in an elevated orientation for rolling along the chutes. They are also oriented for proper receipt at the next station of the food filling and packaging system for further processing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A new and improved conveying system for lifting and orienting multi-diameter push-pull caps comprising, in combination:

a conveyor belt formed of articulated sections and with guide rollers to support the belt with an upper lifting section having an essentially vertical path of travel and a lower loading section with an angled path of travel;

sprockets on the guide rollers to effect movement of the belt in an upward path of travel through the lower section and then the upper section;

a plurality of cleats threadably secured to an exterior surface of the conveyor belt for urging quick and easy installation and removal of each cleat, each cleat having a plurality of supporting treads extending at right angles from the exterior surface of the conveyor belt for retaining push-pull caps thereon in a proper orientation when a nose of the push-pull cap is in contact with the conveyor belt, but to effect the dropping thereof when the push-pull caps are not in the proper orientation;

a plurality of elongated rods transversely oriented on the belt and being in releasable communication with the cleats and the exterior surface of the belt therebetween, each rod further having a trapezoidal cross-section;

a supplemental sprocket in contact with the interior face of the conveyor belt in the lower extent of the upper section to form an outwardly directed bow in the belt and effect the removal, by gravity, of push-pull caps not in the proper orientation;

adjustment means to vary the extent of the bow as a function of the particular push-pull cap being conveyed;

a plate positioned in close proximity to the cleats in the region of the conveyor belt beneath the bow whereby push-pull caps on the conveyor belt may drop under gravity into the hopper due to the orientation of the bow;

a source of pressurized fluid adjacent to an upper extent of the upper section at one lateral side of the belt to pneumatically urge push-pull caps to the opposite lateral side of the belt, the opposite side of the belt being in transfer communication with a plurality of chutes oriented to selectively receive the pneumatically conveyed multi-diameter push-pull caps while maintaining their proper orientation; and a hopper for a quantity of randomly oriented push-pull caps adjacent to the lower section of the conveyor belt for the initial positioning of push-pull caps on the conveyor belt prior to movement to the bow.

2. A conveying system for lifting and orienting multi-diameter push-pull caps comprising:

a conveyor belt formed of articulated sections and with guide rollers to support the belt with an upper section having an essentially vertical path of travel and a lower section with an angled path of travel;

sprockets on the guide rollers to effect movement of the belt in a path of travel through the lower section and then the upper section;

a plurality of cleats secured to the exterior surface of the conveyor belt, the cleats having supporting treads extending at right angles from the exterior surface of the conveyor belt for retaining push-pull caps thereon in a proper orientation when a nose of the push-pull cap is in contact with the conveyor belt and a plurality of cylindrical edges of the push-pull cap is supported on the supporting treads of the cleats but to effect the dropping thereof when the push-pull caps are not in the proper orientation;

a supplemental sprocket in contact with the interior face of the conveyor belt in the lower extent of the upper section to form an outwardly directed bow in the belt and effect the removal, by gravity, of push-pull caps not in the proper orientation; and adjustment means to vary the extent of the bow as a function of the particular bottle cap being conveyed.

3. The apparatus as set forth in claim 2 and further including a source of pressurized fluid adjacent to an upper extent of the upper section at one lateral side of the belt for pneumatically urging push-pull caps to the opposite lateral side of the conveyor belt for selective conveyance through one of a plurality of chutes to receive the pneumatically conveyed push-pull caps while maintaining their proper orientation.

4. The apparatus as set forth in claim 2 and further including a hopper for a quantity of randomly oriented push-pull caps adjacent to the lower section of the conveyor belt for the initial positioning of push-pull caps on the conveyor belt prior to movement to the bow region.

5. The apparatus as set forth in claim 4 and further including a shield having a raised central extent parallel with the direction of flow of the conveyor belt and positioned over the lower loading section whereby push-pull caps dropped thereon will limit movement of the caps onto the conveyor except at the leading edge of the plate.

6. A new and improved conveying system as recited in claim 2 wherein each cleat further includes a riser oriented between the upper tread and the lower tread for urging proper selection and orientation of the multi-diameter push-pull cap in only one orientation, the riser therebetween being sized to reject a multi-diameter push-pull cap that has been improperly oriented on the belt and the dropping thereof into the hopper.

7. A new and improved conveying system as recited in claim 6 wherein each cleat is removably engaged with the metallic rod with fasteners for quickly changing cleats to minimize downtime when changing from one style and size push-pull caps to a second style and size push-pull cap.

8. A new and improved conveying system as recited in claim 6 wherein the plurality of chutes further includes a third output path oriented above a second output path and a first output path to receive all of the properly selected multi-diameter push-pull caps when the first output path or the second output path has reached a full status due to an interruption in the downstream portion of the food processing operation, the third output path for returning the overflow multi-diameter push-pull caps to the hopper therebelow.

9. A new and improved conveying system as recited in claim 8 wherein the first output path is located on one side of the cleat being laterally opposite from the blower and the second output path is oriented above the first output path and also being laterally offset from the blower, and the third output path is oriented above the second output path for accepting the multi-diameter bottle caps as an overflow outlet path for multi-diameter caps that have not entered either the first output path or the second output path for whatever reason.

10. A new and improved conveying system as set forth in claim 9 and further including first actuator means to move a first gate means downwardly to open the first output path, and second actuator means to pivot a second gate means downwardly to close the second output path when the first actuator means opens the first output path.

11. A new and improved conveying system as recited in claim 2 wherein the adjustment means further includes a plate oriented on a side frame of the conveyor system having legible indicia to guide the operator in quickly selecting the correct angular bow to properly orient the multi-diameter push-pull cap based on the materials of construction and the relative diameters of the multi-diameter push-pull cap.

12. A new and improved conveying system as recited in claim 2 wherein the adjustment means further includes a threaded rod and a nut for fixing the desired extent of the angular bow and maintaining that angularity during the full production run on the filling line for each particular multi-diameter push-pull cap.

13. A new and improved conveying system as recited in claim 2 wherein each set of cleats are selected for a particular multi-diameter push-pull cap, each cleat having a riser therebetween the upper and the lower tread with a height adapted for proper orientation of the multi-diameter push-pull cap on the conveyor belt.

14. A new and improved conveying system as recited in claim 2 wherein each cleat further includes an inner side having a recess adapted to slidably engage the elongated rod in a removable trapezoidal mated relationship for properly orienting the multi-diameter push-pull caps.

15. A new and improved cleat for orienting and conveying push-pull caps having a plurality of supporting treads extending essentially horizontally at right angles from an interior surface of an essentially vertically movable conveyor belt for retaining the push-pull caps thereon in a proper orientation, each cleat further having an upper tread and lower tread with a riser oriented between the upper tread and the lower tread adapted for urging proper selection and orientation of the push-pull caps, the riser therebetween being sized to reject a push-pull cap that has been improperly oriented, the cleat being selected for particular push-pull caps.

16. A new and improved transfer system for caps, the transfer system having a source of pressurized air to convey the caps to a plurality of chutes, each chute being oriented to selectively receive the pneumatically conveyed caps while maintaining the proper orientation for the cap, the plurality of chutes being in a nested, stacked relationship and having a first output path oriented lowermost in the relationship for receiving a cap, and a second output path oriented directly above the first output path and being adapted to receive a correctly oriented cap, and a third output path offset from the first and second path for receiving correctly oriented caps in an overflow outlet path that have not entered either the first output path or the second output path for whatever reason, the system further including first actuator means to move a first gate means downwardly to open the first output path, and second actuator means to pivotally close a second gate means to close the second output path when the first actuator means opens the first output path.

17. A new and improved removable cleat for orienting and conveying caps comprising an elongated metallic rod having threaded fasteners for quickly changing the cleat to minimize downtime when changing from one style and size cap to a second style and size cap, the cleat further including an inner side having a recess adapted to slidably engage the elongated rod in a removable, trapezoidal, mated relationship for properly orienting the cap, the cleat still further having at least one generally horizontally disposed supporting tread extending at right angles from the interior surface of a generally vertically disposed conveyor belt for retaining the caps thereon in a proper orientation.

* * * * *